May 30, 1944.  H. P. DAHLSTRAND  2,350,125
BLADE AND SHROUD STRUCTURE
Original Filed May 14, 1941

Inventor
H. P. Dahlstrand
by K. S. Wyman
Attorney

Patented May 30, 1944

2,350,125

UNITED STATES PATENT OFFICE 2,350,125

BLADE AND SHROUD STRUCTURE

Hans P. Dahlstrand, Wauwatosa, Wis., assignor to Allis-Chalmers Manufacturing Company, Milwaukee, Wis., a corporation of Delaware Original application May 14, 1941, Serial No. 393,317, now Patent No. 2,345,918, dated April 4, 1944. Divided and this application February 14, 1942, Serial No. 430,855

5 Claims. (Cl. 253—77)

This invention relates generally to elastic fluid turbine blading and more particularly to a shroud construction for turbine blades.

The construction most commonly employed heretofore comprised forming tenons at the ends of the blades which were passed through or inserted into the holes in the shroud and either riveted over at their protruding ends or united with the shroud by a brazing or welding operation. In some instances, the shroud has been deformed or recessed to provide positioning projections in the manner shown by U. S. patent to C. E. Search, No. 1,187,450, June 13, 1916, Steam turbine, and the top surfaces of the blades were united with the bottom surface of the shroud by brazing. However, these known constructions have not been entirely satisfactory since considerable stock is wasted in machining or otherwise forming tenons on the ends of the blades and since the tenon forming operation is time consuming and costly. Moreover, the riveting or the welding of the tenon to the shroud produces a rough upper surface which materially increases windage losses. Furthermore, it is extremely difficult and in many instances impossible to perform the tenon forming and riveting operations on blades which are mounted in a turbine and consequently blades in actual service which require reshrouding usually must be removed from the turbine which is a time consuming and a costly procedure. In addition, the removal of an existing shroud structure which is secured to the blades by riveting, brazing or welding requires a cutting or grinding operation which invariably destroys the tenons and necessitates the formation of new tenons, thereby reducing the effective length of the blades and the flow capacity of the blading. The C. E. Search type of construction, which eliminates the tenon forming operation, is also objectionable in that the upper surface is rendered relatively rough by the formation of the positioning projections which materially increases windage losses and in that the shroud strip must be brazed to the ends of the blades before the blades are inserted in the turbine as it is commercially impractical to insert the entire turbine spindle in a brazing furnace. With the Search type of construction, blades in actual service which require reshrouding must also be removed from the turbine and consequently, the Search type of construction is also objectionable and affords but little actual advantage with respect to tenon type constructions heretofore employed.

The method of shrouding blades in the manner herein shown and described is fully disclosed and claimed in my copending application, Serial No. 393,317, filed May 14, 1941, of which this application is a division.

It is, therefore, an object of this invention to provide an improved shrouding for the ends of turbine blades which permits existing blade structures to be reshrouded without removing the blades from the turbine and without changing the flow capacity of the blading.

Another object of this invention is to provide an improved shrouding for the ends of turbine blades which entirely eliminates providing the end of the blade which is to be shrouded with tenons, projections and the like for positioning and securing the shroud thereon.

Still another object of this invention is to provide an improved shrouding for the ends of turbine blades which produces a substantially smooth upper surface, thereby reducing windage losses.

Still another object of this invention is to provide an improved shrouding for the ends of turbine blades which is inexpensive and which provides a stronger construction than that heretofore produced.

The invention accordingly consists of the various methods and of the various details of construction, combinations of elements and arrangements of parts, as more particularly set forth in the appended claims and in the detailed description, in which:

Figure 1:
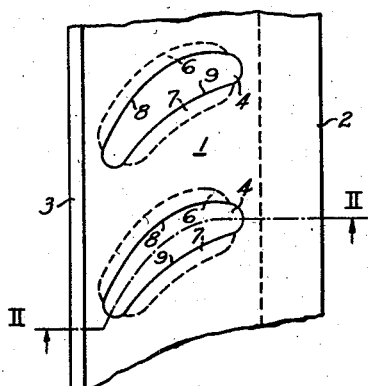
Fig. 1 is a plan view of shrouding embodying the invention.
Figure 4:
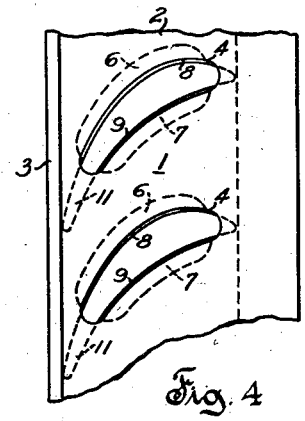
Fig. 4 is a plan view of the shroud as positioned on blading preparatory to performing the welding operation.
Figure 2:
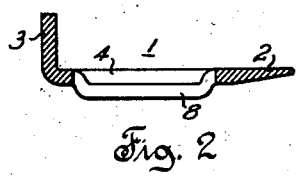
Fig. 2 is a sectional view taken on line II—II of Fig. 1.
Figure 5:
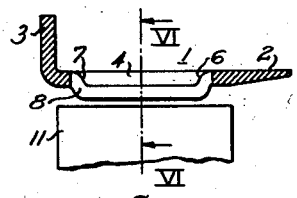
Fig. 5 is a sectional view similar to Fig. 2 showing the shroud positioned in superposed relation with respect to the end of a blade.
Figure 6:
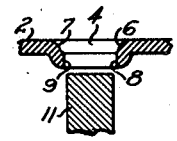
Fig. 6 is a sectional view taken on line VI—VI of Fig. 5.
Figure 3:
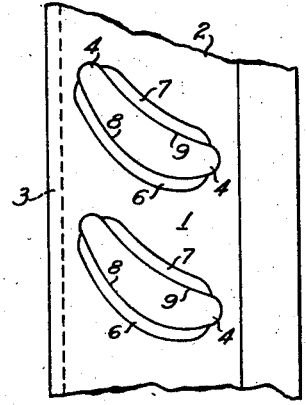
Fig. 3 is a bottom view of the shroud shown in Fig. 1.

Referring to the drawing and particularly Figs. 1-3, it is seen that the shroud 1 comprises a suitable metal strip having a base portion 2 dimensioned to span the ends of one or more blades and an upstanding sealing flange 3. The base portion 2 is provided with elongated openings 4 conforming in number and arrangement to the ends of the blades on which the strip is to be positioned and secured. The length of each opening 4 is somewhat less than the width of the blade at the end at which the shroud is to be attached and each opening is shaped to approximate the configuration of an intermediate and major portion of the single surfaced end of a blade as it appears when viewed in plan, as is best shown in Fig. 4. Stated differently, the side edges 6 and 7 of each opening are shaped to conform with the portions of the side surfaces of the end of the blade which extend between points near the inlet and outlet edges of the blade. The expression, "single surfaced end," as used herein, is intended to apply to a blade end which is free of any projection or recess abruptly interrupting the continuity of the end surface of the blade and therefore the expression includes blade ends having surfaces which are either plane or curved, these surfaces being either perpendicular or oblique relative to the edges and to the side surfaces of the blade.

Each opening 4 has its opposite side edges 6 and 7 forced downward a sufficient distance to provide spaced opposed surfaces 8 and 9, respectively, adapted to receive therebetween an intermediate and major portion of the single surfaced end of the blade to which the shroud is to be secured, as is best seen in Figs. 2-8, inclusive. Best results are obtained when the distance to which the side edges of the openings are depressed approximately equals the thickness of the metal shroud strip. The openings 4 and the depression of the side edges thereof may be formed in either one or two operations by using a suitable die or dies, respectively. However, the particular manner in which the openings 4 are made is immaterial and a further description in this connection is not necessary for a complete understanding of the invention.

Figure 7:
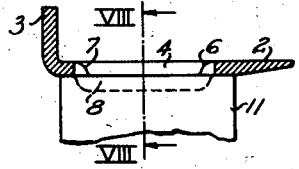
Fig. 7 is a sectional view showing the shroud positioned on the end of the blade.
Figure 8:
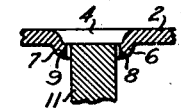
Fig. 8 is a sectional view taken on line VIII—VIII of Fig. 7.
Figure 9:
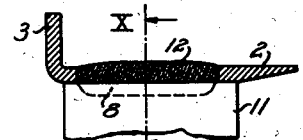
Fig. 9 is a sectional view similar to Fig. 7 showing the structure after the weld metal has been deposited.
Figure 10:
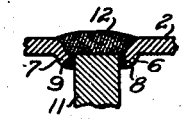
Fig. 10 is a sectional view taken on line X—X of Fig. 9.

The shroud strip containing the opening 4 is then placed on the single surfaced end of the blade 11 so that portions of the underside of the base 2 of the shroud strip adjacent each end of the opening 4 rests on or engages portions of the single surfaced end of the blade adjacent the inlet and outlet edges thereof with the intermediate and major portion of the single surfaced end of the blade confined between the opposed surfaces 8 and 9 of the depressed edge portions 6 and 7, respectively, as is best seen in Figs. 4, 7 and 8. The shroud strip 1 is held on the single surfaced end of the blade 11 in the position just described by any suitable means such as a clamp (not shown), and weld metal is deposited in the recess defined by the depressed edges 6 and 7 and the portion of the single surfaced end of the blade which is confined between the surfaces 8 and 9. The weld metal 12 may be deposited in the said recess by any suitable means such as an electric arc welding apparatus (not shown), and sufficient metal should be deposited to completely fill the recess, as shown in Figs. 9 and 10, thereby providing a substantially smooth upper surface. The opposed edge surfaces 8 and 9 are preferably spaced a slight distance from the side surfaces of the blade 11 in order to facilitate assembly and in order to permit more weld metal to enter the space provided between said surfaces and to fuse with said surfaces as indicated in Fig. 10. However, satisfactory results will be obtained if the surfaces 8 and 9 actually engage the side surfaces of the blade 11. After the shroud strip has been welded to the single surfaced end of the blade in the manner just described, the resulting blade structure is preferably heat treated in order to remove any stresses which may have been set up incidental to the welding operation.

The invention is applicable for reshrouding existing blade structures without removing the blades from the turbine and without changing the flow capacity of the blading, simply by removing the attached shroud strip and the portions of the blades extending above the under surface of the shroud strip, so as to provide the blades which are to be reshrouded with single surfaced ends. The removal of the existing shroud structure from the blades can be readily accomplished by a suitable turning or grinding operation and preferably the latter, since a portable hand grinding tool can be used. A shroud strip provided with the requisite number of openings 4 is then placed on the single surfaced ends of the blades and welded thereto in the manner hereinabove described. In this connection, a shroud strip dimensioned to span a series of several blades should be welded first to one end blade of said series, then to the other end blade of said series, then to a blade disposed approximately midway between said end blades, and then to the remaining blades of said series in any desired order. This sequence of welding has been found to produce a unitary structure which is sufficiently free from welding stresses to permit the elimination of the stress relieving heat treatment mentioned in the preceding paragraph. In fact, blades which have been reshrouded in the manner just described have been tested and found to be substantially as strong as those which were shrouded and heat treated prior to being mounted in the turbine. In addition, it has also been demonstrated that the reshrouding of blades in this manner does not appreciably change the flow capacity of the blading and in one instance the flow capacity and the efficiency were actually increased. The increase in flow capacity and efficiency is attributable to the fact that the effective length of the blades remained the same while the size of the fillet on the underside of the replacement shroud strip was actually less than the corresponding fillet which was present on the original structure.

The shrouding and reshrouding of blades in the manner herein described is relatively inexpensive and provides a structure which is extremely durable and considerably stronger than that heretofore produced by known methods and it should therefore be understood that it is not desired to limit the invention to the exact procedure and construction herein shown and described, as various modifications within the scope of the appended claims may occur to persons skilled in the art.

It is claimed and desired to secure by Letters Patent:

1. A blade structure for turbines and the like comprising a blade having a single surfaced end, a shroud member having its inner fluid confining surface disposed in abutting relation against said end of the blade and including therein an elongated opening conforming with and exposing an intermediate and major portion of said blade, said opening having its opposite side edges depressed a distance approximately equal to the thickness of said shroud member, and weld metal substantially filling the recess formed by said depressed side edges and said exposed major portion of the blade end.

2. A blade structure for turbines and the like comprising a blade having a single surfaced end, a shroud member having its inner fluid confining surface disposed in abutting relation against said end of the blade and including therein an elongated opening conforming with and exposing an intermediate and major portion of said blade end, said opening having its opposite side edges depressed sufficiently to position top surface portions thereof substantially flush with the exposed major portion of said blade end thereby forming an elongated recess having as its bottom surface said exposed major portion of said blade end, and weld metal substantially filling said recess.

3. A blade structure for turbines and the like comprising a blade having a single surfaced end, a shroud member having a substantially plain fluid confining surface disposed in abutting relation against said end of the blade and including therein an opening therethrough conforming with and exposing an intermediate portion of said blade end, said opening having its opposite side edges depressed sufficiently to receive the exposed end of the blade therebetween with the end surface thereof disposed approximately flush with the top surface of said depressed side edges, and weld metal substantially filling the recess formed by said depressed side edges of the exposed end surface of said blade.

4. A blade structure for turbines and the like comprising a blade having a single surfaced end, a shroud member having a substantially plain fluid confining surface disposed in abutting relation against said end of the blade and including therein an opening therethrough conforming with and exposing an intermediate portion of said blade end, said opening having its side edges depressed sufficiently to form an elongated recess having a bottom wall defined by the end surface of said exposed intermediate portion of the blade end, and weld metal substantially filling said recess.

5. A blade structure for turbines and the like comprising a blade having a single surfaced end, a shroud member having a substantially plain fluid confining surface disposed in abutting relation against said end of the blade and having an elongated opening therethrough exposing an intermediate portion of said blade end, said opening having offset edge portions disposed in abutting relation to opposed side surface portions of the exposed blade end to form therewith an elongated recess having a bottom wall defined by the exposed end surface of said blade, and weld metal substantially filling said recess.

HANS P. DAHLSTRAND.

CERTIFICATE OF CORRECTION.

Patent No. 2,350,125. May 30, 1944.

HANS P. DAHLSTRAND.

It is hereby certified that error appears in the printed specification of the above numbered patent requiring correction as follows: Page 3, first column, line 1, claim 1, after the word "blade" and before the comma insert --end--; and that the said Letters Patent should be read with this correction therein that the same may conform to the record of the case in the Patent Office.

Signed and sealed this 25th day of July, A. D. 1944.

(Seal)

Leslie Frazer
Acting Commissioner of Patents.